United States Patent [19]
Yoshioka

[11] Patent Number: 6,089,115
[45] Date of Patent: Jul. 18, 2000

[54] ANGULAR TRANSMISSION USING MAGNETORHEOLOGICAL FLUID (MR FLUID)

[75] Inventor: Jun Yoshioka, Fort Wayne, Ind.

[73] Assignee: Dana Corporation, Toledo, Ohio

[21] Appl. No.: 09/136,194

[22] Filed: Aug. 19, 1998

[51] Int. Cl.[7] .............................. F16H 1/14; F16D 27/00
[52] U.S. Cl. ............................................ 74/417; 192/21.5
[58] Field of Search .................. 74/DIG. 4, 417, 74/640; 192/21.5

[56] References Cited

U.S. PATENT DOCUMENTS

| | | | |
|---|---|---|---|
| 2,688,879 | 9/1954 | Logan et al. | 74/191 |
| 3,250,341 | 5/1966 | Takahashi . | |
| 4,015,182 | 3/1977 | Erdman | 318/334 |
| 4,162,435 | 7/1979 | Wright | 318/138 |
| 4,459,519 | 7/1984 | Erdman | 318/254 |
| 4,491,772 | 1/1985 | Bitting | 318/254 |
| 4,492,903 | 1/1985 | Knight et al. | 318/341 |
| 4,494,055 | 1/1985 | Bitting et al. | 318/254 |
| 4,499,408 | 2/1985 | Bitting et al. | 318/254 |
| 4,500,821 | 2/1985 | Bitting et al. | 318/254 |
| 4,642,537 | 2/1987 | Young | 318/254 |
| 4,744,914 | 5/1988 | Filisko et al. | 252/74 |
| 4,761,600 | 8/1988 | D'Atre et al. | 318/759 |
| 4,857,814 | 8/1989 | Duncan | 318/281 |
| 4,874,993 | 10/1989 | Tanaka et al. | 318/254 |
| 4,879,056 | 11/1989 | Filisko et al. | 252/74 |
| 5,036,264 | 7/1991 | Ueki | 318/254 |
| 5,057,753 | 10/1991 | Leuthold et al. | 318/254 |
| 5,130,620 | 7/1992 | Inaji et al. | 318/254 |
| 5,134,349 | 7/1992 | Kruse | 318/254 |
| 5,144,209 | 9/1992 | Ingji et al. | 318/254 |
| 5,162,710 | 11/1992 | Reinhart et al. | 318/254 |
| 5,166,583 | 11/1992 | Min et al. | 318/138 |
| 5,187,419 | 2/1993 | DeLange | 318/805 |
| 5,198,733 | 3/1993 | Wright | 318/254 |
| 5,202,613 | 4/1993 | Kruse | 318/254 |

(List continued on next page.)

FOREIGN PATENT DOCUMENTS

1733771 A1  1/1984  U.S.S.R. .............................. 74/DIG. 4

*Primary Examiner*—David A. Bucci
*Assistant Examiner*—Colby Hansen
*Attorney, Agent, or Firm*—Oldham & Oldham Co., L.P.A.

[57] ABSTRACT

An angular transmission using magnetorheological fluid (MR fluid) to transmit movement between two (2) shafts not aligned on the same axis to each other to provide an infinite variable ratio instead of the fixed ratios present in known prior art gear driven angular transmissions by controlling the magnetic field applied to the magnetorheological fluid (MR fluid) through the use of one (1) or more electric coil(s) generating a magnetic field. In particular, the angular transmission using magnetorheological fluid (MR fluid) in accordance with a preferred embodiment of the present invention includes a pair of conical shaped hollow heads, one connected to an input shaft and one connected to an output shaft, the input shaft, the output shaft and the conical shaped hollow heads being assembled inside of a housing where the input shaft and the output shaft are mounted at an angle to each other (i.e., are not axially aligned), the space or gap between the two (2) conical shaped hollow heads being filled with magnetorheological fluid (MR fluid). At least one (1) electric coil and, more preferably, a pair, or a multitude, of electric coils are installed inside the two (2) hollow heads.

The magnetorheological fluid (MR fluid), when exposed to a magnetic field, changes its viscosity to provide for increased shear stress resistance of the magnetorheological fluid (MR fluid). This increase in viscosity provides for the motion transmission between each of the conical shaped hollow heads and consequently to each of the input shaft and the output shaft in a rate, or ratio, proportional to the magnetic field generated by the electric coil(s). The shape of the electric coil(s) could be of a multitude of possible designs to produce a magnetic field having desired characteristics. Control of the electric coil(s) is provided by an electronic controller which interfaces with a multitude of sensors which provide sensorial information from various operation monitoring systems.

20 Claims, 1 Drawing Sheet

U.S. PATENT DOCUMENTS

| | | | |
|---|---|---|---|
| 5,202,616 | 4/1993 | Peters et al. | 318/254 |
| 5,233,275 | 8/1993 | Danino | 318/254 |
| 5,254,914 | 10/1993 | Dunfield et al. | 318/254 |
| 5,277,281 | 1/1994 | Carlson et al. | 188/267 |
| 5,284,330 | 2/1994 | Carlson et al. | 267/140.14 |
| 5,306,988 | 4/1994 | Carobolante et al. | 318/254 |
| 5,317,243 | 5/1994 | Cameron | 318/254 |
| 5,321,342 | 6/1994 | Kruse | 318/254 |
| 5,327,053 | 7/1994 | Mann et al. | 318/254 |
| 5,343,127 | 8/1994 | Maiocchi | 318/254 |
| 5,367,234 | 11/1994 | DiTucci | 318/254 |
| 5,382,373 | 1/1995 | Carlson et al. | 252/62.55 |
| 5,382,889 | 1/1995 | Peters et al. | 318/254 |
| 5,384,527 | 1/1995 | Rozman et al. | 322/10 |
| 5,397,971 | 3/1995 | McAllister et al. | 318/254 |
| 5,397,972 | 3/1995 | Maiocchi | 318/439 |
| 5,398,917 | 3/1995 | Carlson et al. | 267/140.14 |
| 5,423,192 | 6/1995 | Young et al. | 62/228.4 |
| 5,431,241 | 7/1995 | May et al. | |
| 5,505,880 | 4/1996 | Kormann et al. | |
| 5,506,487 | 4/1996 | Young et al. | 318/811 |
| 5,552,076 | 9/1996 | Gamota et al. | 252/74 |
| 5,552,685 | 9/1996 | Young et al. | 318/254 |
| 5,573,088 | 11/1996 | Daniels. | |
| 5,592,058 | 1/1997 | Archer et al. | 318/254 |
| 5,598,908 | 2/1997 | York et al. | 192/21.5 |
| 5,603,240 | 2/1997 | Klovstad et al. | |
| 5,659,231 | 8/1997 | Svarovsky et al. | 318/368 |
| 5,845,753 | 12/1998 | Bansbach | 192/21.5 |

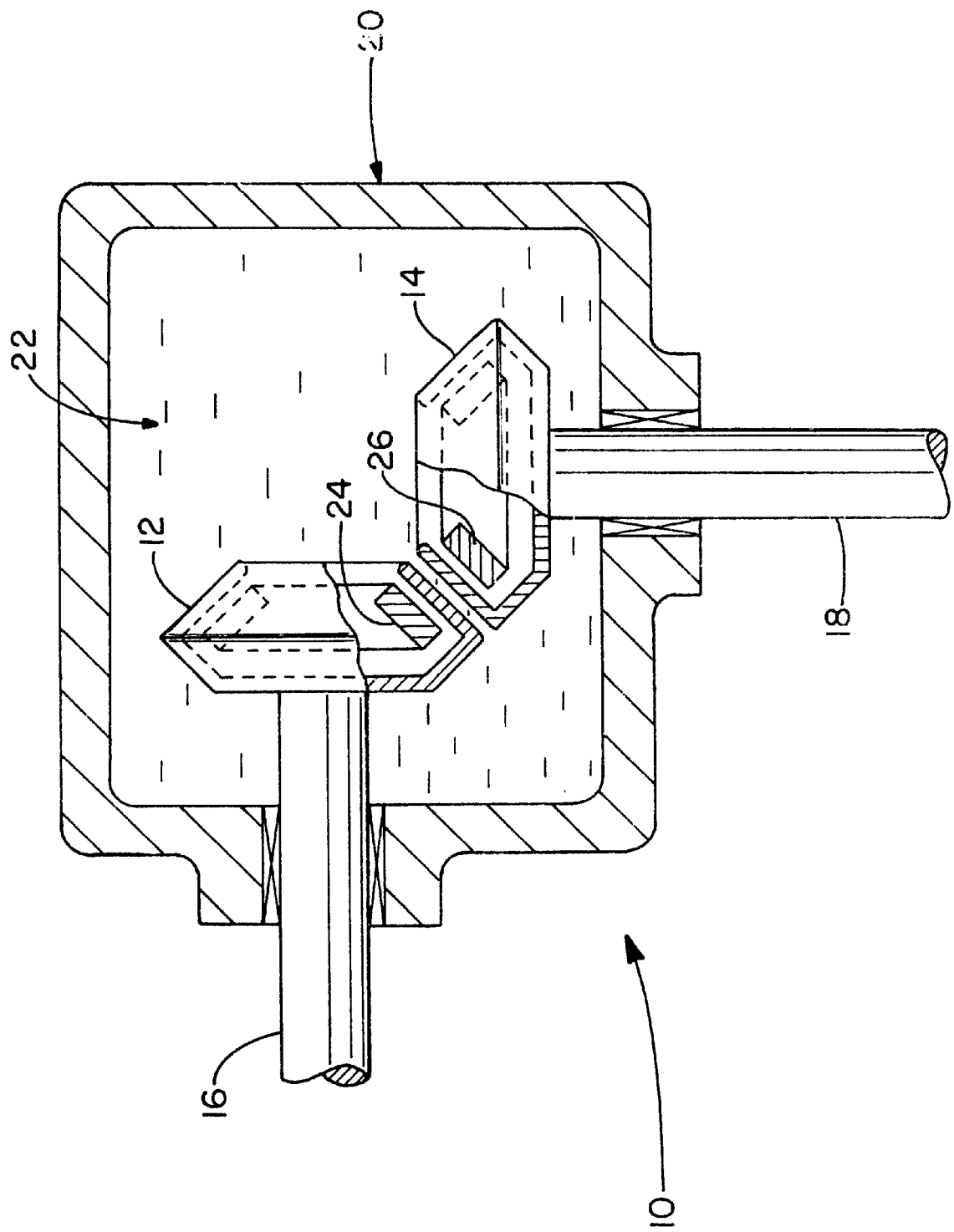

ANGULAR TRANSMISSION USING MAGNETORHEOLOGICAL FLUID (MR FLUID)

BACKGROUND AND SUMMARY OF THE INVENTION

The present invention relates generally to a new and novel angular transmission using magnetorheological fluid (MR fluid). More particularly, the present invention relates to a new and novel angular transmission using magnetorheological fluid (MR fluid) which uses magnetorheological fluid (MR fluid) to transmit movement between two (2) shafts which are not aligned on the same axis to each other to provide an infinite variable ratio instead of the fixed ratios present in known prior art gear driven angular transmissions by controlling the magnetic field applied to the magnetorheological fluid (MR fluid) through the use of one (1) or more electric coil(s) generating a magnetic field.

In known prior art gear driven angular transmissions, a predetemined number of fixed drive ratios are provided dependent on the ratios between, and the number of gears utilized in, such gear driven angular transmissions. Such known prior art gear driven angular transmissions are, thus, limited in the number of different drive ratios they can provide. Furthermore, in order to provide a wider range of drive ratios and/or a greater number of drive ratios, additional gears are generally utilized which increases the cost and complexity of such gear driven angular transmissions.

It would be desirable to provide an angular transmission which would provide an infinite variable ratio rather than the limited number of different drive ratios provided by known gear driven angular transmissions.

A preferred embodiment of the present invention is, therefore, directed to an angular transmission using magnetorheological fluid (MR fluid) to transmit movement between two (2) shafts not aligned on the same axis to each other to provide an infinite variable ratio instead of the fixed ratios present in known prior art gear driven angular transmissions by controlling the magnetic field applied to the magnetorheological fluid (MR fluid) through the use of one (1) or more electric coil(s) generating a magnetic field. In particular, the angular transmission using magnetorheological fluid (MR fluid) in accordance with a preferred embodiment of the present invention includes a pair of conical shaped hollow heads, one connected to an input shaft and one connected to an output shaft, the input shaft, the output shaft and the conical shaped hollow heads being assembled inside of a housing where the, input shaft and the output shaft are mounted at an angle to each other (i.e., are not axially aligned), the space or gap between the two (2) hollow heads being filled with magnetorheological fluid (MR fluid). At least one (1) electric coil and, more preferably, a pair, or a multitude, of electric coils are installed inside the two (2) conical shaped hollow heads.

The magnetorheological fluid (MR fluid), when exposed to a magnetic field, changes its viscosity to provide for increased shear stress resistance of the magnetorheological fluid (MR fluid). This increase in viscosity provides for the motion transmission between each of the conical shaped hollow heads and consequently to each of the input shaft and the output shaft in a rate, or ratio, proportional to the magnetic field generated by the electric coil(s). The shape of the electric coil(s) could be of a multitude of possible designs to produce a magnetic field having desired characteristics. Control of the electric coil(s) is provided by an electronic controller which interfaces with a multitude of sensors which provide sensorial information from various operation monitoring systems.

Other advantages and novel features of the present invention will become apparent in the following detailed description of the invention when considered in conjunction with the accompanying drawing.

BRIEF DESCRIPTION OF THE DRAWING

The single FIGURE is a side elevational view, partially in cross-section and partially in plan view, of an angular transmission using magnetorheological fluid (MR fluid) in accordance with a preferred embodiment of the present invention.

DETAILED DESCRIPTION OF THE DRAWING

In the following detailed description of a preferred embodiment of the present invention, reference is made to the accompanying drawing which, in conjunction with this detailed description, illustrates and describes a preferred embodiment of an angular transmission using magnetorheological fluid (MR fluid), generally identified by reference number 10, in accordance with the present invention. Referring now to the drawing, which illustrates a side elevational view, partially in cross-section and partially in plan view, of angular transmission using magnetorheological fluid (MR fluid) 10 in accordance with a preferred embodiment of the present invention. Angular transmission using magnetorheological fluid (MR fluid) 10 generally transmits movement between two (2) shafts not aligned on the same axis to provide an infinite variable ratio instead of the fixed drive ratios present in known prior art gear driven angular transmissions by controlling the magnetic field applied to the magnetorheological fluid (MR fluid) through the use of one (1) or more electric coil(s) generating a magnetic field.

In particular, angular transmission using magnetorheological fluid (MR fluid) 10 in accordance with the present invention generally includes a pair of conical shaped hollow heads 12 and 14, conical shaped hollow head 12 being connected to input shaft 16 and conical shaped hollow head 14 connected to output shaft 18. Conical shaped hollow heads 12 and 14 can be integrally formed as a part of input shaft 16 and output shaft 18, respectively or alternatively, conical shaped hollow heads 12 and 14 could be separate pieces which are attached to input shaft 16 and output shaft 18, respectively. Conical shaped hollow head 12 of input shaft 16 and conical shaped hollow head 14 of output shaft 18 are positioned inside housing 20 where input shaft 16 and output shaft 18 are mounted at an angle to each other (i.e., not axially aligned), the space or gap between conical shaped hollow head 12 and conical shaped hollow head 14 being filled with magnetorheological fluid (MR fluid) 22. One (1) or more and, more preferably, a pair, or a multitude, of electric coils 24 and 26 are installed inside conical shaped hollow head 12 and conical shaped hollow head 14, respectively.

Magnetorheological fluid (MR fluid) 22, when exposed to a magnetic field, changes its viscosity to provide for increased shear stress resistance of magnetorheological fluid (MR fluid) 22. This increase in viscosity provides for the motion transmission between conical shaped hollow head 12 and conical shaped hollow head 14 and consequently to input shaft 16 and output shaft 18 in a rate, or ratio, proportional to the magnetic field generated by electric coils 24 and 26. The shape of electric coils 24 and 26 could be of a multitude of possible designs to produce a magnetic field having desired characteristics. Control of electric coils 24 and 26 is provided by an electronic controller (not shown) which interfaces with a multitude of sensors which provide sensorial information from various operation monitoring systems.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. An angular transmission, comprising:

a housing having magnetorheological fluid (MR fluid) in the interior thereof;

a first shaft having a hollow head positioned in said interior of said housing;

a second shaft having a hollow head positioned in said interior of said housing, said first shaft being at an angle to said second shaft; and at least one (1) electric coil positioned in the interior of at least one of said hollow head of said first shaft and said hollow head of said second shaft, said at least one (1) electric coil being capable of generating a magnetic field such that said magnetorheological fluid (MR fluid), when exposed to said magnetic field, changes its viscosity to provide for increased shear stress resistance in said magnetorheological fluid (MR fluid) and this change in viscosity of said magnetorheological fluid (MR fluid) provides motion transmission between said hollow head of said first shaft and said hollow head of said second shaft in a rate, or ratio, proportional to said magnetic field generated by said at least one (1) electric coil.

2. The angular transmission in accordance with claim 1, wherein said first shaft is an input shaft and said second shaft is an output shaft.

3. The angular transmission in accordance with claim 1, wherein said hollow head of said first shaft has a conical configuration and said hollow head of said second shaft has a conical configuration.

4. The angular transmission in accordance with claim 1, wherein control of said at least one (1) electric coil is provided by an electronic controller.

5. The angular transmission in accordance with claim 4, wherein said electronic controller receives sensorial information from various operation monitoring system sensors.

6. The angular transmission in accordance with claim 1, wherein said first shaft is positioned at substantially a right angle to said second shaft.

7. An angular transmission, comprising:

a housing having magnetorheological fluid (MR fluid) in the interior thereof;

a first shaft having a hollow head positioned in said interior of said housing, said hollow head having an electric coil positioned in the interior thereof;

a second shaft having a hollow head positioned in said interior of said housing, said hollow head having an electric coil positioned in the interior thereof and said first shaft being at an angle to said second shaft; and said electric coil positioned in the interior of said hollow head of said first shaft and said electric coil positioned in the interior of said hollow head of said second shaft are capable of generating a magnetic field such that said magnetorheological fluid (MR fluid), when exposed to said magnetic field, changes its viscosity to provide for increased shear stress resistance in said magnetorheological fluid (MR fluid) and this change in viscosity of said magnetorheological fluid (MR fluid) provides motion transmission between said hollow head of said first shaft and said hollow head of said second shaft in a rate, or ratio, proportional to said magnetic field generated by said electric coil positioned in the interior of said hollow head of said first shaft and said electric coil positioned in the interior of said hollow head of said second shaft.

8. The angular transmission in accordance with claim 7, wherein said first shaft is an input shaft and said second shaft is an output shaft.

9. The angular transmission in accordance with claim 7, wherein said hollow head of said first shaft has a conical configuration and said hollow head of said second shaft has a conical configuration.

10. The angular transmission in accordance with claim 7, wherein control of said electric coil in said hollow head of said first shaft and said electric coil in said hollow head of said second shaft is provided by an electronic controller.

11. The angular transmission in accordance with claim 10, wherein said electronic controller receives sensorial information from various operation monitoring system sensors.

12. The angular transmission in accordance with claim 10, wherein said electronic controller receives sensorial information from various operation monitoring system sensors.

13. The angular transmission in accordance with claim 7, wherein said first shaft is positioned at substantially a right angle to said second shaft.

14. The angular transmission in accordance with claim 7, wherein said hollow head of said first shaft is integrally formed as a part of said first shaft and said hollow head of said second shaft is integrally formed as a part of said second shaft.

15. The angular transmission in accordance with claim 7, wherein said hollow head of said first shaft is a separate piece which is attached to said first shaft and said hollow head of said second shaft is a separate piece which is attached to said second shaft.

16. An angular transmission, comprising:

a housing having magnetorheological fluid (MR fluid) in the interior thereof;

a first shaft having a hollow head positioned in said interior of said housing, said hollow head having a plurality of electric coils positioned in the interior thereof;

a second shaft having a hollow head positioned in said interior of said housing, said hollow head having a plurality of electric coils positioned in the interior thereof and said first shaft being at an angle to said second shaft; and said plurality of electric coils positioned in the interior of said hollow head of said first shaft and said plurality of electric coils positioned in the interior of said hollow head of said second shaft are capable of generating a magnetic field such that said magnetorheological fluid (MR fluid), when exposed to said magnetic field, changes its viscosity to provide for increased shear stress resistance in said magnetorheological fluid (MR fluid) and this change in viscosity of said magnetorheological fluid (MR fluid) provides motion transmission between said hollow head of said first shaft and said hollow head of said second shaft in a rate, or ratio, proportional to said magnetic field generated by said plurality of electric coils positioned in the interior of said hollow head of said first shaft and said plurality of electric coils positioned in the interior of said hollow head of said second shaft.

17. The angular transmission in accordance with claim 16, wherein said first shaft is an input shaft and said second shaft is an output shaft.

18. The angular transmission in accordance with claim 16, wherein said hollow head of said first shaft has a conical configuration and said hollow head of said second shaft has a conical configuration.

19. The angular transmission in accordance with claim 16, wherein control of said plurality of electric coils in said hollow head of said first shaft and said plurality of electric coils in said hollow head of said second shaft is provided by an electronic controller.

20. The angular transmission in accordance with claim 16, wherein said first shaft is positioned at substantially a right angle to said second shaft.

* * * * *